United States Patent
Hoshino et al.

(10) Patent No.: US 10,484,592 B2
(45) Date of Patent: Nov. 19, 2019

(54) FOCUS ADJUSTMENT DEVICE, FOCUS ADJUSTMENT METHOD, AND NON-TRANSITORY STORAGE MEDIUM FOR STORING FOCUS ADJUSTMENT PROGRAMS FOR PERFORMING FOCUS ADJUSTMENT IN RESPONSE TO IMAGE SIGNALS OF AN IMAGE PICKUP DEVICE INCLUDING FOCUS DETECTION PIXELS

(71) Applicant: Olympus Corporation, Hachioji-shi, Tokyo (JP)

(72) Inventors: Tomohiro Hoshino, Hachioji (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 36 days.

(21) Appl. No.: 15/821,674

(22) Filed: Nov. 22, 2017

(65) Prior Publication Data

US 2018/0152619 A1 May 31, 2018

(30) Foreign Application Priority Data

Nov. 29, 2016 (JP) .................................. 2016-231650

(51) Int. Cl.
*H04N 5/235* (2006.01)
*H04N 5/232* (2006.01)
*H04N 5/243* (2006.01)

(52) U.S. Cl.
CPC ..... *H04N 5/23212* (2013.01); *H04N 5/23293* (2013.01); *H04N 5/243* (2013.01)

(58) Field of Classification Search
CPC ........................... H04N 5/23212; H04N 5/243

USPC ....................................................... 348/229.1
See application file for complete search history.

(56) References Cited

U.S. PATENT DOCUMENTS

2015/0181095 A1* 6/2015 Yamaguchi .......... H04N 5/2352
348/229.1
2016/0337578 A1* 11/2016 Kikuchi ............. H04N 5/23212
2017/0310880 A1* 10/2017 Kikuchi ................. G03B 13/32

FOREIGN PATENT DOCUMENTS

JP 2005-341448 12/2005

* cited by examiner

*Primary Examiner* — Usman A Khan
(74) *Attorney, Agent, or Firm* — John C. Pokotylo; Pokotylo Patent Services

(57) ABSTRACT

A focus detection section performs focus detection based on image signals of focus detection pixels of an image pickup device, included in the image signals acquired based on an exposure value for a live view display, calculates a gain correction value to correct the image signals of the focus detection pixels based on a result of the focus detection, and corrects image signals of focus detection pixels to be acquired by a next image pickup operation with the gain correction value to perform the focus detection. A control section causes the image pickup device to perform an AF image pickup operation using exposure value corrected based on the gain correction value, as an exposure value for the AF image pickup operation. The focus detection section performs focus detection based on the image signals of the focus detection pixels in accordance with the AF image pickup operation.

22 Claims, 8 Drawing Sheets

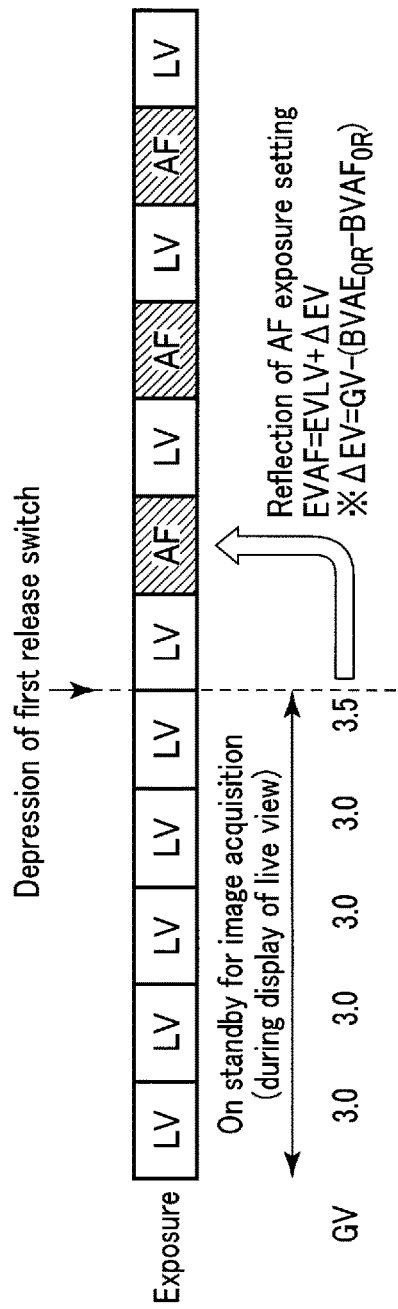
F I G. 7

FOCUS ADJUSTMENT DEVICE, FOCUS ADJUSTMENT METHOD, AND NON-TRANSITORY STORAGE MEDIUM FOR STORING FOCUS ADJUSTMENT PROGRAMS FOR PERFORMING FOCUS ADJUSTMENT IN RESPONSE TO IMAGE SIGNALS OF AN IMAGE PICKUP DEVICE INCLUDING FOCUS DETECTION PIXELS

CROSS-REFERENCE TO RELATED APPLICATION

This application is based upon and claims the benefit of priority from prior Japanese Patent Application No. 2016-231650, filed on Nov. 29, 2016, the entire contents of which are incorporated herein by reference.

BACKGROUND OF THE INVENTION

1. Field of the Invention

The present invention relates to a focus adjustment device for adjusting a focus of a focus lens of, for example, an image pickup apparatus, a focus adjustment method for doing the same, and a non-transitory storage medium for storing focus adjustment programs.

2. Description of the Related Art

Optical Instruments such as image pickup apparatuses have an automatic focus adjustment function (what is called an autofocus (AF) function) to adjust a focus automatically. The AF function includes various types of systems. For example, a phase difference AF system is known in which focusing is performed by the pupil division type imaging plane phase difference detection system on the basis of a signal output from a focus detecting pixel row formed in, for example, an image pickup device.

Jpn. Pat. Appln. KOKAI Publication No. 2005-341448 discloses an electronic camera device including a focus adjustment device of the above phase difference AF system and proposes the following technology for controlling appropriate imaging conditions in accordance with an image-acquisition situation. More specifically, during an image-acquisition standby mode, the camera device checks control results of automatic exposure (AE) and auto white balance (AWB), and updates and stores the number of times each of the control results continuously falls within a predetermined proper range. When the number of times is equal to or larger than the prescribed number and an object immediately before image acquisition is changed very little in an image-acquisition mode, an image of the object is picked up under the control of AE and AWB based upon a control value acquired last during the image-acquisition standby mode.

BRIEF SUMMARY OF THE INVENTION

According to a first aspect of the present invention, there is provided a focus adjustment device which performs focus adjustment in response to image signals of an image pickup device including focus detection pixels, the device comprising: a display section configured to provide live view display based on the image signals of the image pickup device; an exposure control section configured to control an image pickup operation of the image pickup device based on an exposure value for the live view display to acquire the image signals; a focus detection section configured to perform focus detection based on image signals of the focus detection pixels, included in the image signals of the image pickup device, calculate a gain correction value to correct the image signals of the focus detection pixels based on a result of the focus detection, and correct image signals of focus detection pixels to be acquired by a next image pickup operation with the gain correction value to perform the focus detection; an instruction section configured to provide instruction to start focus adjustment; and a control section configured to perform focus adjustment based on the image signals of the focus detection pixels in accordance with the instruction of the instruction section, wherein the control section corrects the exposure value based on the gain correction value by the exposure control section in accordance with the instruction of the instruction section and causes the image pickup device to perform an AF image pickup operation using the corrected exposure value as an exposure value for the AF image pickup operation, and the focus detection section performs focus detection based on the image signals of the focus detection pixels in accordance with the AF image pickup operation.

According to a second aspect of the present invention, there is provided a focus adjustment method for performing focus adjustment by image signals of an image pickup device including focus detection pixels, the method comprising: controlling an image pickup operation of the image pickup device based on an exposure value for providing live view display to a display section based on the image signals of the image pickup device to acquire the image signals; performing focus detection based on image signals of the focus detection pixels, included in the image signals of the image pickup device, calculating a gain correction value to correct the image signals of the focus detection pixels based on a result of the focus detection, and performing focus detection by correcting image signals of focus detection pixels acquired in a next image pickup operation, with the gain correction value; providing instruction to start the focus adjustment; correcting the exposure value based on the gain correction value when the focus adjustment is performed based on the image signals of the focus detection pixels in accordance with the instruction to start the focus adjustment, and causing the image pickup device to perform an AF image pickup operation using the corrected exposure value as an exposure value for the AF image pickup operation; and performing focus detection based on the image signals of the focus detection pixels by the AF image pickup operation.

According to a third aspect of the present invention, there is provided a non-transitory storage medium for storing computer-readable focus adjustment programs which are executed by a computer which performs focus adjustment by image signals of an image pickup device including focus detection pixels, when the focus adjust programs are executed by the computer, the focus adjust programs causing the computer to: control an image pickup operation of the image pickup device based on an exposure value for providing live view display to a display section based on the image signals of the image pickup device to acquire the image signals; perform focus detection based on image signals of the focus detection pixels, included in the image signals of the image pickup device, calculate a gain correction value to correct the image signals of the focus detection pixels based on a result of the focus detection, and perform focus detection by correcting image signals of focus detection pixels acquired in a next image pickup operation, with the gain correction value; provide instruction to start the focus adjustment; correct the exposure value based on the gain correction value when the focus adjustment is performed based on the image signals of the focus detection pixels in accordance with the instruction to start the focus adjustment, and cause the image pickup device to perform an AF image pickup operation using the corrected exposure value as an exposure value for the AF image pickup operation; and perform focus detection based on the image signals of the focus detection pixels by the AF image pickup operation.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIG. 7 is a diagram for illustrating an operation of reflecting the AF exposure setting.

DETAILED DESCRIPTION OF THE INVENTION

A focus adjustment device according to an embodiment of the present invention will be described below with reference to the drawings. The embodiment is directed to an example where the focus adjustment device is applied to a lens-integrated image pickup apparatus such as a generally-used compact camera that precludes a lens from being removed from the camera main body. The focus adjustment device according to the embodiment can also be applied to a lens-interchangeable image pickup apparatus including a body unit and an interchangeable lens unit (i.e. a lens barrel) as an accessory device.

Figure 1:
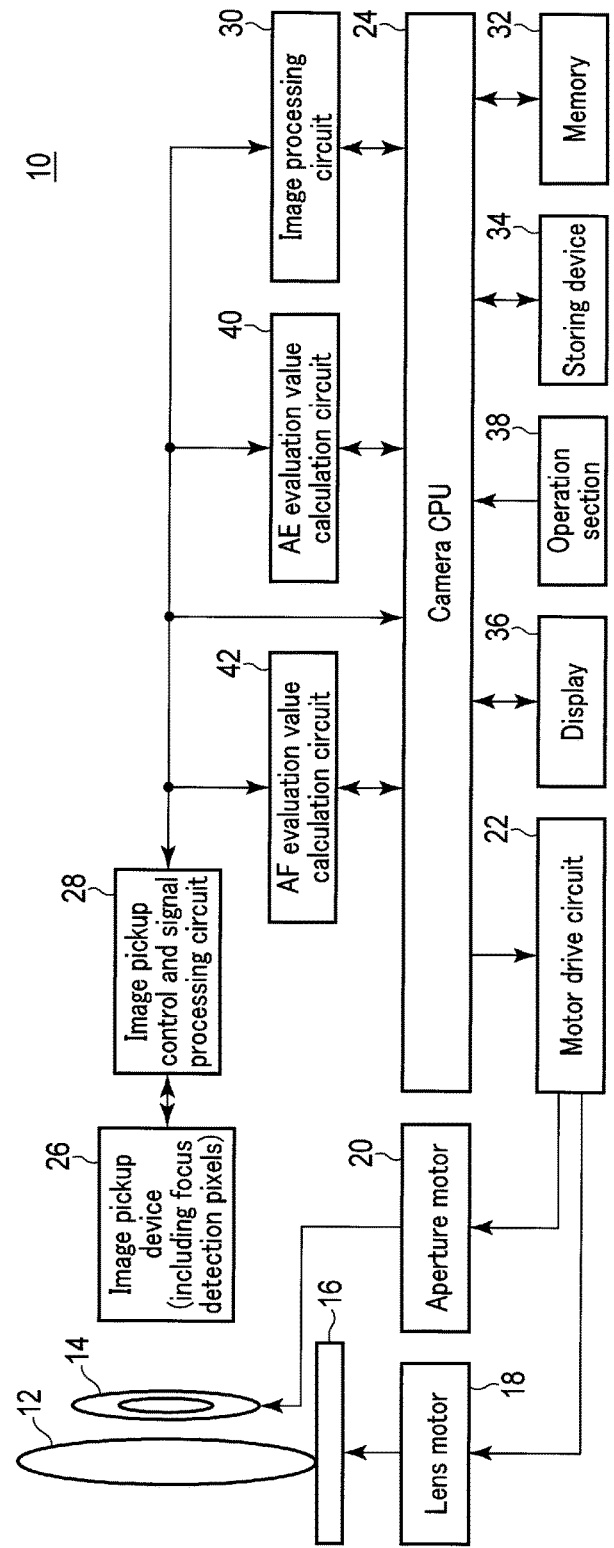
FIG. 1 is a block diagram of an image pickup apparatus to which a focus adjustment device according to an embodiment of the present invention is applied.

As shown in FIG. 1, an image pickup apparatus 10 to which the focus adjustment device according to the embodiment of the present invention is applied, includes an image-acquiring lens 12 including a focus lens, an aperture 14, a lens frame 16, a lens motor 18, an aperture motor 20, a motor drive circuit 22, a camera CPU 24, an image pickup device 26, an image pickup control and signal processing circuit 28, an image processing circuit 30, a memory 32, a storing device 34, a display 36, an operation section 38, an AE evaluation value calculation circuit 40 and an AF evaluation value calculation circuit 42.

The image-acquiring lens 12 is supported by the lens frame 16. The lens motor 18 moves the lens frame 16 to move the focus lens of the image-acquiring lens 12 along the direction of the optical axis. The aperture motor 20 opens and closes the aperture 14 to adjust the opening of the aperture 14. The lens motor 18 and the aperture motor 20 are driven via the motor drive circuit 22 in response to a control signal from the camera CPU 24.

The image pickup device 26 is provided on the optical axis of the image-acquiring lens 12 and intended to photoelectrically convert an object image that has passed through the image-acquiring lens 12. In other words, a luminous flux that has passed through the image-acquiring lens 12 and the aperture 14 is formed into an image on the imaging plane of the image pickup device 26. The image pickup device 26 is configured as one the exposure of which can be controlled by an electronic shutter (e.g. an electronic rolling shutter). Examples of the image pickup device 26 include a CMOS sensor and a CCD. The electronic rolling shutter refers to a shutter which resets a plurality of pixels arranged two-dimensionally on the imaging plane of the image pickup device 26 or reads signals from the pixels such that the pixel resetting or signal reading is executed in time series for each pixel or for each line. In other words, the image pickup device 26 electronically controls signal accumulation time for each pixel or each line to allow a function similar to that of a mechanical shutter to be fulfilled.

Figure 2:
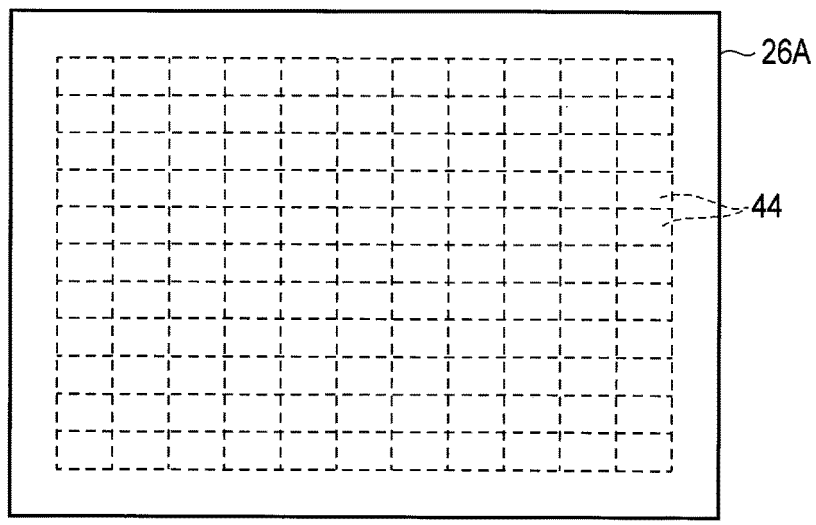
FIG. 2 is an illustration of a plurality of AF areas set in an image pickup area of an image pickup device.

Though not shown in the figure, the image pickup device 26 includes focus detection pixels to adjust a focus by the pupil division type phase difference detection system. As shown in FIG. 2, the camera CPU 24 sets a plurality of focus detection areas, or 11×11=121 focus detection areas in this embodiment (referred to as AF areas 44 hereinafter) in an image pickup area 26A of the image pickup device 26. Thus, the camera CPU 24 serves as a setting section which sets the AF areas 44 in the image pickup area 26A of the image pickup device 26. In the image pickup device 26, the focus detection pixels are arranged in their respective AF areas 44.

The image pickup device 26 is connected to the image pickup control and signal processing circuit 28. The image pickup control and signal processing circuit 28 is connected to the camera CPU 24 to control the electronic shutter of the image pickup device 26 in accordance with an instruction from the camera CPU 24.

The image processing circuit 30, memory 32, storing device 34, display 36, operation section 38, AE evaluation value calculation circuit 40 and AF evaluation value calculation circuit 42 are connected to the camera CPU 24.

The image processing circuit 30 is used for image processing. The image pickup control and signal processing circuit 28 is connected to the image processing circuit 30. The camera CPU 24, image pickup device 26, image pickup control and signal processing circuit 28, image processing circuit 30, memory 32 and storing device 34 can provide an electronic image pickup function.

The image processing circuit 30 loads image signals from the image pickup device 26 via the image pickup control and signal processing circuit 28 in accordance with an instruction from the camera CPU 24. The image signals are converted into video signals by the image processing circuit 30, and the video signals are output to and displayed on the display 36 via the camera CPU 24. A photographer can check the acquired image in the displayed image on the display 36.

The memory 32, which is provided as a storage area, includes, for example, an SDRAM and a flash ROM. The SDRAM is a memory for temporary storage of image signals and is used as a work area or the like when image signals are converted. The image signals are subjected to various types of image processing and thus converted into JPEG data, which is stored in the storing device 34. The storing device 34 is an external storage medium such as various memory cards and an external hard disk drive (HDD). The storing device 34 is installed interchangeably in the image pickup apparatus 10. The flash ROM stores in a nonvolatile manner control programs to be executed by the camera CPU 24. The control programs include the focus adjustment programs according to the embodiment of the present invention. Thus, the flash ROM can serve as a non-transitory storage medium for storing the focus adjustment programs. The SDRAM is also used as a buffer for temporarily storing data such as control parameters and mode setting values which are referenced or rewritten during execution of the control programs.

Though not shown in the figures, the operation section 38 includes a switch group including operation buttons needed to operate the image pickup apparatus 10, such as a release switch that gives an instruction to perform an image acquisition operation, a mode change switch that switches between an image acquisition mode and an image display mode, and a power switch. The release switch involves a half-press operation for a release button, that is, a first release switch depressing operation, and a second release depressing operation that is a full-press operation for the release button.

The AE evaluation value calculation circuit 40 calculates an automatic exposure (AE) evaluation value for each of the AF areas 44 from the image signals output from the image pickup device 26. The camera CPU 24 sets an exposure value (a shutter speed and an f-number) based on the AE evaluation value calculated by the AE evaluation value calculation circuit 40. The camera CPU 24 supplies the motor drive circuit 22 with a control signal corresponding to the set f-number. Accordingly, the motor drive circuit 22 drives the aperture motor 20 to open or close the aperture 14.

The AF evaluation value calculation circuit 42 loads image signals from focus detection pixels in each of the AF areas 44 of the image pickup device 26 via the image pickup control and signal processing circuit 28, performs focus detection by phase difference pixel calculation, and outputs a defocus amount of the image-acquiring lens 12 from the focus detection result. The AF evaluation value calculation circuit 42 also calculates an AF evaluation value, which is indicative of contrast, based on image signals output from all pixels including the focus detection pixels in each of the AF areas 44. In this case, however, the signal values of the image signals output from the focus detection pixels need to be doubled. The camera CPU 24 determines a lens position where the camera is focused using a focus lens provided in the image-acquiring lens 12, based on the defocus amount output from the AF evaluation value calculation circuit 42.

It is of course that a dedicated sensor corresponding to each of the AF areas 44 may be provided instead of the focus detection pixels provided in the image pickup device 26.

In the image pickup apparatus 10 configured as described above, a luminous flux incident through the image-acquiring lens 12 is guided to the image pickup device 26 via the aperture 14 in the image-acquiring standby state before the first release switch depressing operation. The image pickup device 26 generates image signals. The image processing circuit 30 controls the image pickup control and signal processing circuit 28 in accordance with an instruction from the camera CPU 24, and causes the image pickup control and signal processing circuit 28 to load the image signals from the image pickup device 26. The loaded image signals are stored in the memory 32, which is a memory for temporary storage, via the camera CPU 24. The image signals are read out of the memory 32 by the image processing circuit 30 via the camera CPU 24. The image processing circuit 30 converts the read image signals into video signals and outputs the video signals to the display 36 via the camera CPU 24 so that the display device 36 can provide the image. Consequently, the photographer can check the acquired image in the displayed image on the display 36, that is, what is called a live view (LV) image.

During the display of the LV image, an exposure value is set for the LV display. In other words, the AE evaluation value calculation circuit 40 calculates AE evaluation values for the AF areas 44, and the camera CPU 24 sets an LV exposure value on the basis of an average of the AE evaluation values. Alternatively, the camera CPU 24 sets an LV exposure value, for example, using an AE evaluation value of an AF area 44 near the center of the image pickup area of the image pickup device 26 and using a weighted average obtained by weighting the AE evaluation values in the AF areas 44 more greatly towards the center of the image pickup area of the image pickup device 26. Hereinafter, the exposure value will be represented as an APEX value. The camera CPU 24 and the AE evaluation value calculation circuit 40 function as an exposure control section which controls the image pickup operation of the image pickup device 26 based on the LV exposure value for the LV display to acquire image signals.

In each image pickup frame for the LV display (referred to as an LV frame hereinafter), the AF evaluation value calculation circuit 42 loads image signals of focus detection pixels from the image signals of each of the AF areas 44 of the image pickup device 26, and performs focus detection by performing phase difference pixel calculation. The focus detection is performed using image signals based on the LV exposure value for the LV display as described above, not based on an AF exposure value for the focus detection. Thus, a result of the focus detection is used in defocus amount calculation for focus adjustment when its reliability is sufficiently high. The result of the focus detection is not used for focus adjustment when the reliability is not sufficiently high. The result of the focus detection is used in the camera CPU 24 to calculate a gain correction value to correct the image signals of the focus detection pixels. In other words, the AF evaluation value calculation circuit 42 includes a gain correction circuit to correct image signals in accordance with a set gain correction value. The gain correction value is set from the camera CPU 24. Thus, the AF evaluation value calculation circuit 42 corrects the image signals of the focus detection pixels acquired in the current LV frame by the gain correction value calculated from the focus detection result of the last LV frame, and performs focus detection. The camera CPU 24 and the AF evaluation value calculation circuit 42 function as a focus detection section which performs focus detection based on image signals of focus detection pixels, included in the image signals of the image pickup device 26, calculates a gain correction value to correct the image signals of the focus detection pixels based on a result of the focus detection, and corrects image signals of focus detection pixels acquired by the next image pickup operation with the gain correction value.

When a first release switch is depressed as an instruction section for instructing a photographer to start focus adjustment, the camera CPU 24 corrects the LV exposure value on the basis of the gain correction value. The camera CPU 24 causes the image pickup device 26 to perform an AF image pickup operation, with the corrected LV exposure value as an AF exposure value for the AF image pickup operation. Thus, the AF evaluation value calculation circuit 42 loads the image signals of the focus detection pixels by the AF image pickup operation, performs focus detection by the phase difference pixel calculation, and calculates a defocus amount of the image-acquiring lens 12. The cameral CPU 24 determines a lens position in which the focus lens of the image-acquiring lens 12 is focused, based on the defocus amount output from the AF evaluation value calculation circuit 42. The camera CPU 24 moves the lens frame 16 via the motor drive circuit 22 and the lens motor 18 in accordance with the determined lens position. Accordingly, the camera CPU 24 can move the focus lens of the image-acquiring lens 12 to the determined lens position along the direction of the optical axis. Thus, the camera CPU 24 functions as a control section which performs focus adjustment in response to the image signals of the focus detection pixels in accordance with an instruction to start the focus adjustment.

The correction of the LV exposure value based on the gain correction value is performed only in one image pickup frame (referred to as an AF frame) for the first focus detection after the first release switch is depressed. In the subsequent AF frame, the AE evaluation value calculation circuit 40 calculates an AE evaluation value for each of the AF areas 44, and the camera CPU 24 sets an AF evaluation value based on the average value of AE evaluation values of the AF areas 44, in which an object has been viewed in the last AF frame, namely, a defocus amount that is equal to or larger than a predetermined value is calculated, or based on the AE evaluation value of an AF area in which the defocus amount indicates the nearest object.

As described above, the AE evaluation value calculation circuit 40, AF evaluation value calculation circuit 42 and camera CPU 24 function as a focus adjustment device.

When a second release switch for instructing the photographer to acquire an image is depressed, the camera CPU 24 supplies the image pickup control and signal processing circuit 28 with a signal for driving and controlling the electronic shutter. In response to the signal, the image pickup control and signal processing circuit 28 controls the electronic shutter. As described above, the image processing circuit 30 loads the image signals from the image pickup device 26 into the memory 32 in accordance with an instruction from the camera CPU 24. Subsequently, the image processing circuit 30 executes various types of image processing on the image signals loaded into the memory 32, converts the resultant signal into JPEG data, and stores the JPEG data in the storing device 34. When the image signals is a moving image, the image processing circuit 30 converts the image signals into MPEG data or the like and then stores the resultant data in the storing device 34.

Figure 3A:
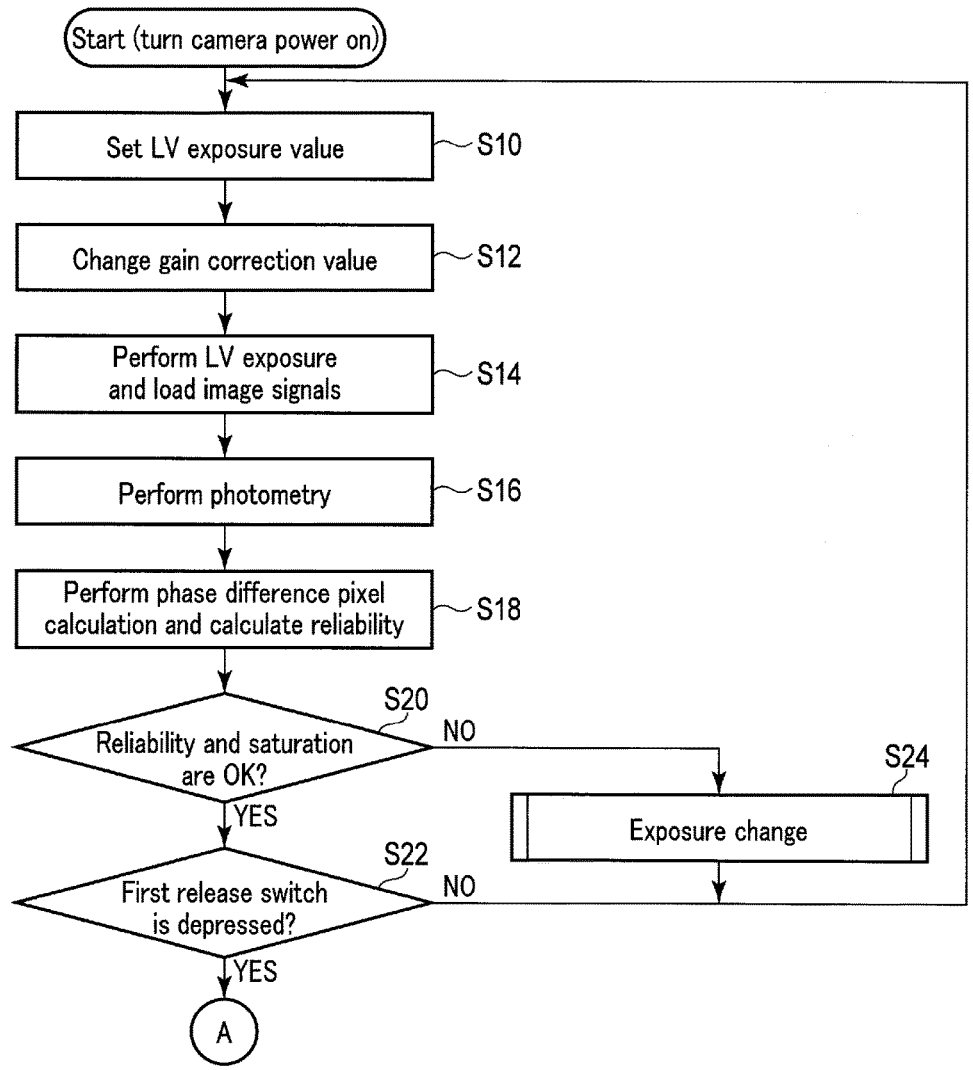
FIG. 3A is a first half of the flowchart for focus adjustment programs according to the embodiment of the present invention.
Figure 3B:
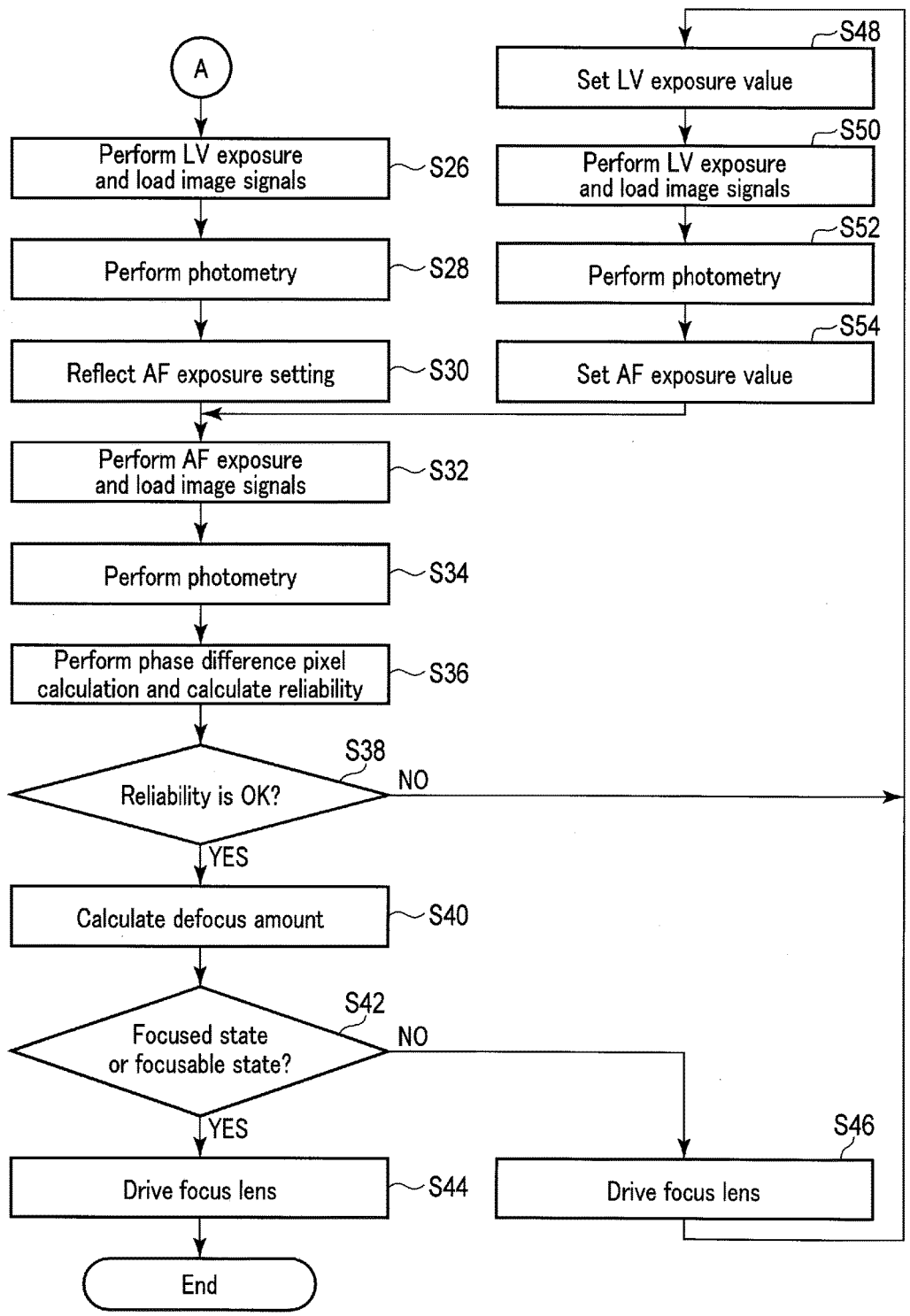
FIG. 3B is a second half of the flowchart for the focus adjustment programs according to the embodiment of the present invention.

When the photographer operates the mode change switch in the operation section 38 to switch from the image acquisition mode to the image display mode, the image signals are read out of the storing device 34 and can be displayed on the display 36. In other words, the image processing circuit 30 reads the image signals from the storing device 34, converts it into a video signal, and outputs the video signal to the display 36 via the camera CPU 24 so that the display 36 can provide display. An AF operation in the image pickup apparatus 10 configured as described above will be described in detail below with reference to a series of flowcharts illustrated in FIGS. 3A and 3B. In the AF operation, the camera CPU 24, which is a computer that performs focus adjustment in response to image signals of the image pickup device including focus detection pixels, executes focus adjustment programs according to one embodiment of the present invention, which are stored in a non-transitory storage medium, such as a flash ROM as described above.

First, when the photographer operates the power switch in the operation section 38 to turn on a body power supply, the camera CPU 24 performs a predetermined initialization operation, gets ready for image acquisition, and allows the display 36 to provide LV display.

More specifically, the camera CPU 24 first sets an exposure value (referred to as a pre-release LV exposure value $EVLV_{OR}$ hereinafter) for LV display (step S10). The camera CPU 24 then changes a gain correction value of the gain correction circuit of the AF evaluation value calculation circuit 42 (step S12). In other words, the camera CPU 24 reflects a gain correction value GV calculated in the last LV display frame. Since no photometry has been performed yet when the body power supply is turned on, the initial set value is set to the exposure value in step S10 and the gain correction value in step S12.

The camera CPU 24 causes the image pickup device 26 to perform LV exposure by the pre-release LV exposure value $EVLV_{OR}$, causes the AF evaluation value calculation circuit 42 to load image signals of focus detection pixels, included in the image signals of the AF areas 44 of the image pickup device 26, and causes the AE evaluation value calculation circuit 40 and the image processing circuit 30 to load the image signals of all pixels including the focus detection pixels of the AF areas (step S14). In response to the image signals loaded into the image processing circuit 30, the display 36 provides LV display.

The camera CPU 24 causes the AE evaluation value calculation circuit 40 to perform photometry to calculate an AE evaluation value for each of the AF areas 44 (step S16). For each of the AF areas 44, the AE evaluation value calculation circuit 40 calculates a pre-release LV photometry result $BVAE_{OR}$ as a first photometric value obtained by LV photometry from the image signals of all pixels including the focus detection pixels and calculates a pre-release AF photometry result $BVAF_{OR}$ as a second photometric value obtained by AF photometry from the image signals of focus detection pixels. Thus, the AE evaluation value calculation circuit 40 functions as a photometry section which generates a first photometric value obtained by LV photometry and a second photometric value obtained by photometry for focus adjustment in response to the image signals of the image pickup device 26. Based on pre-release LV photometry results $BVAE_{OR}$ of the AF areas 44, the camera CPU 24 calculates the next pre-release LV exposure value $EVLV_{OR}$ on the basis of, e.g. the average value of the LV photometry results.

The camera CPU 24 causes the AF evaluation value calculation circuit 42 to perform focus detection by phase difference pixel calculation for each of the AF areas 44 and calculate reliability for each of the AF areas 44 (step S18). In this step, the AF evaluation value calculation circuit 42 performs focus detection for the image signals of each of the AF areas 44, which are loaded from the image pickup device 26, using a gain-corrected value. As an index value of reliability to be calculated by the camera CPU 24, a contrast value of image signals of the focus detection pixels, a minimum value in the results of correlation calculation as phase difference pixel calculation, a slope (rate of change FS) between the minimum value and a larger one of the correlation calculation results both adjacent to the minimum value, etc. can be used. The index value of reliability is stored in the memory 32 together with index values for old frames. For example, as will be described later, the current and seven-frame-old index values and the older index values therebetween are stored in the memory 32 as history information. Thus, the camera CPU 24 functions as a calculation section which makes a focus detection calculation in response to image signals of focus detection pixels to calculate reliability.

The process of step S16 and that of step S18 can be performed in reverse order. Alternatively, these processes can be performed in parallel and at the same time.

The camera CPU 24 determines whether there is an AF area 44 in which the reliability is OK and saturation is OK (step S20). If the index value of reliability is the contrast value, the camera CPU 24 determines that the reliability is OK when the contrast value is larger than a contrast value threshold value. If the index value of reliability is the minimum value, the camera CPU 24 determines that the reliability is OK when the minimum value is smaller than a predetermined minimum value threshold value. If the index value of reliability is the rate of change FS, the camera CPU 24 determines that the reliability is OK when the rate of change FS is larger than a predetermined change rate threshold value. If the reliability is OK for all of these index values, the camera CPU 24 determines that reliability of the AF area 44 is OK. As for saturation determination, when the number of pixels in an AF area 44 that output image signals whose values are larger than a predetermined saturation signal value threshold value, is smaller than a predetermined saturation pixel number threshold value, the camera CPU 24 determines that saturation is OK, namely, the image signals are not saturated.

Upon determining in step S20 that there is even one AF area 44 in which the reliability is OK and saturation is OK, the camera CPU 24 determines whether the photographer has depressed the release switch in the operation section 38 halfway, namely, whether the photographer has performed the first release depressing operation by depressing the first release switch (step S22). Upon determining that the first release depressing operation is not performed, the camera CPU 24 returns the process to step S10 described above.

In contrast, upon determining in step S20 that there is no AF area 44 in which the reliability is OK and saturation is OK, the camera CPU 24 performs an exposure change subroutine (step S24). Then, the camera CPU 24 returns the process to step S10 described above.

Figure 4:
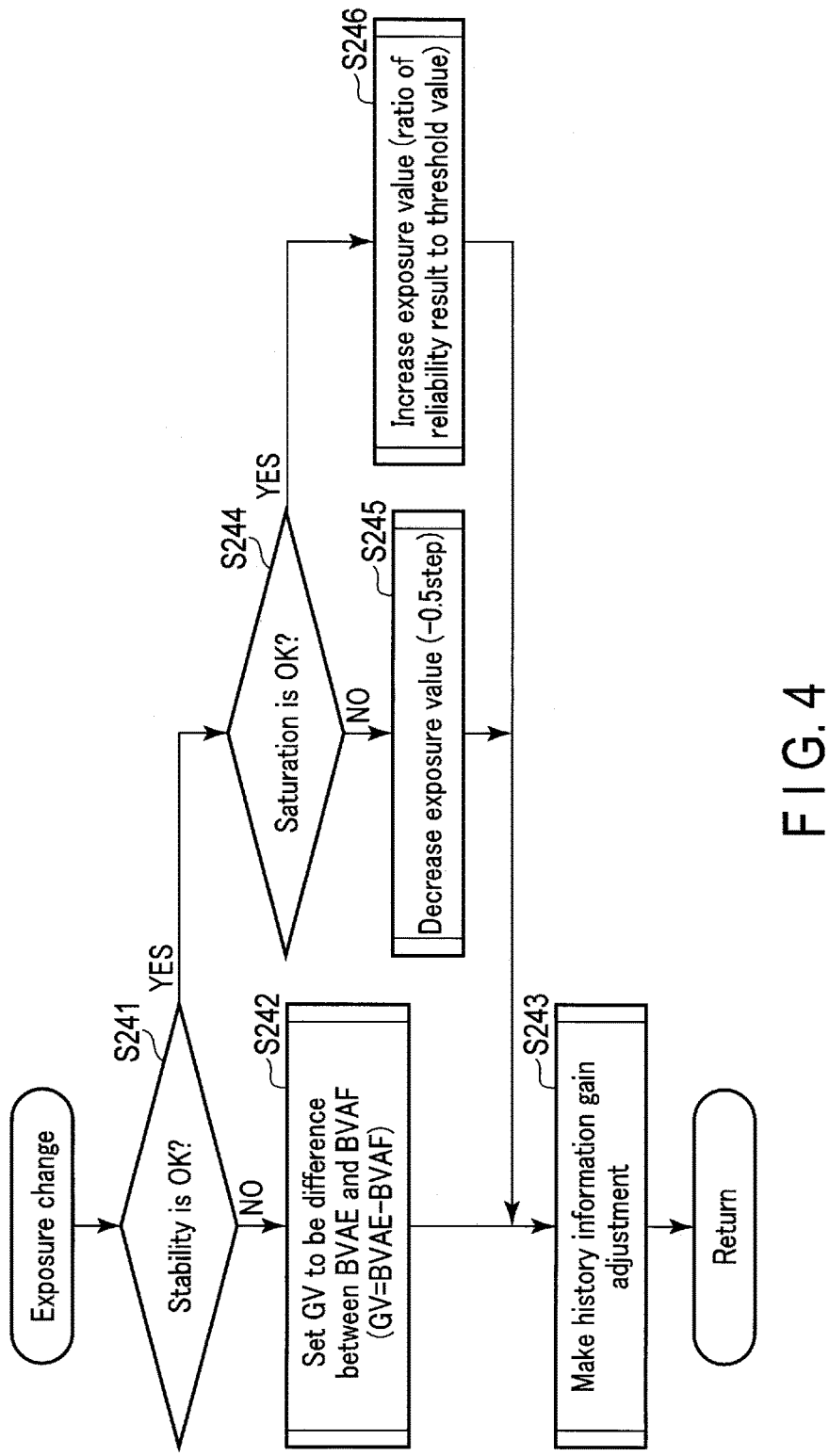
FIG. 4 is a flowchart for illustrating the process of an exposure change subroutine shown in FIG. 3A.
Figure 5:
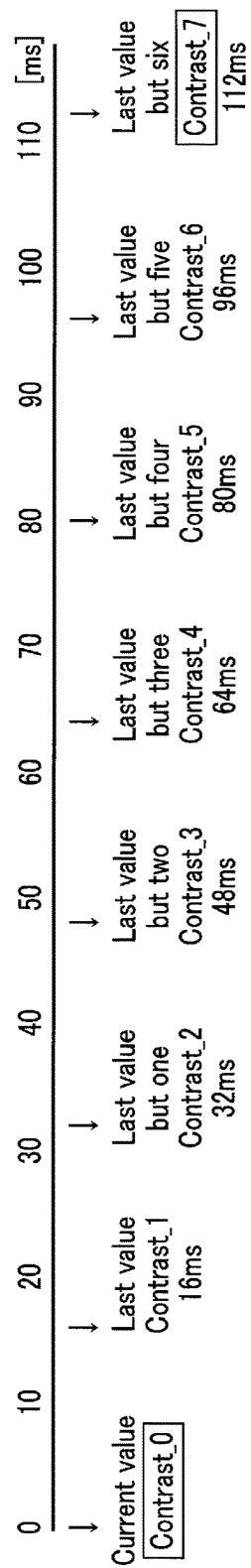
FIG. 5 is a diagram for illustrating the stability.

In the exposure change subroutine in step S24, as shown in FIG. 4, the camera CPU 24 first determines whether stability is OK according to how much the contrast value and the rate of change FS in the index values of reliability used for the reliability determination in step S20 are changed (step S241). In other words, the camera CPU 24 compares the current index value and the old index value (the 100 msec or older index value) stored in the memory 32 as history information, and determines whether the contrast value and the rate of change are not changed too much (namely they are stabilized). For example, FIG. 5 illustrates an example where calculation is performed once per 16 msec with respect to the contrast value as the index value of reliability. In this example, the current contrast value Contrast_0 is compared with the seven-old contrast value Contrast_7, which a 100 msec or older one. The camera CPU 24 determines that the stability is OK if the following expression is satisfied:

Old Index Value*$FCS\_IP\_0R\_LOW\_STABILITY \leq$ Current

Index Value $\leq$ Old Index Value*$FCS\_IP\_0R\_UP\_STABILITY$, where FCS_IP_0R_LOW_STABILITY and FCS_IP_0R_UP_STABILITY are each a constant representing a permissible variation rate of 0.5, 2, etc.

Upon determining in step S241 that the stability is not OK, namely, the index values are not stable, the camera CPU 24 sets the gain correction value GV of the gain correction circuit of the AF evaluation value calculation circuit 42 in a difference between the pre-release LV photometry result $BVAE_{OR}$ and the pre-release AF photometry result $BVAF_{OR}$, which are calculated in step S16 (step S242). In other words, when the index values are unstable, the camera CPU 28 sets a value in which only the difference between the photometry results is taken into consideration so as not to increase or decrease the exposure value excessively in accordance with the first release switch depressing operation. Note that the calculated gain correction value GV is stored temporarily in the memory 32.

The camera CPU 24 makes a history information gain adjustment (step S243). Then, the camera CPU 24 ends the exposure change subroutine and returns the process to step S10. In the case where the gain correction value GV is set, if the camera CPU 24 performs the exposure change subroutine next time with history information as the unchanged result, it is likely to repeat the same process by determining in step S241 that the stability is not OK. To prevent this, it is necessary to make an adjustment to the old results of the rate of change FS and the contrast value. This adjustment is made by multiplying the exposure step corresponding to the difference between the current gain correction value GV and the next gain correction value GV, by the current history information, as given by the expressions indicated below. This is basically based upon the idea that the reliability determination results vary with the exposure step:

New History Information=Current History Information*(Next Gain Correction Value GV−Current Gain Correction Value GV).

When the value of (Next Gain Correction Value GV−Current Gain Correction Value GV) is negative, the current history information is multiplied by the inverse of the absolute value of the difference, as given by the following expression:

New History Information=Current History Result/ |Next Gain Correction Value GV−Current Gain Correction Value GV|.

Upon determining in step S241 that the stability is OK, namely, the index values are stable, the camera CPU 24 further determines whether the saturation is OK (step S244). The camera CPU 24 thus functions as a determination section that determines whether the image signals of the focus detection pixels are saturated or not.

Upon determining that the saturation is not OK, namely, the image signal is saturated, the camera CPU 24 calculates a gain correction value GV in which the exposure value is decreased by 0.5 step (step S245). After that, the camera CPU 24 advances the process to step S243.

Figure 6:
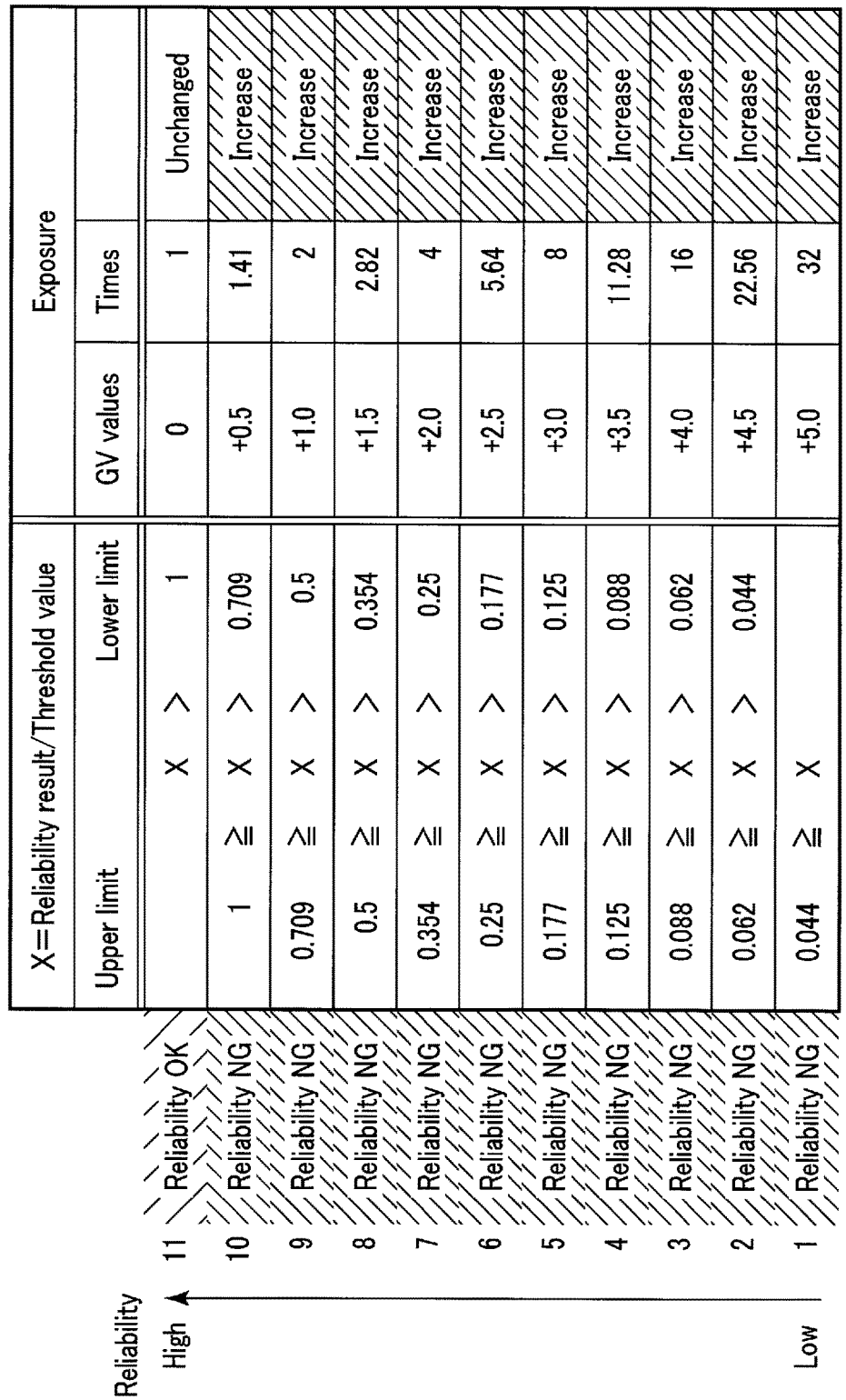
FIG. 6 is an example of a table showing GV values corresponding to ratios X of reliability results and reliability threshold values.

In contrast, upon determining that the saturation is OK, namely, the image signals are not saturated, the camera CPU 24 calculates a gain correction value GV in which the exposure value is increased according to the ratio of reliability results to reliability determination threshold values (step S246). The memory 32 prestores a table indicating how much the gain correction value GV is increased in relation to ratio X of reliability results to reliability determination threshold values (a table indicating GV values corresponding to the ratio), as shown in FIG. 6. Accordingly, the camera CPU 24 calculates the ratio X and adds a GV value corresponding to the ratio X to the gain correction value GV at this point in time with reference to the table. The camera CPU 24 thus outputs a gain correction value GV to be changed. The camera CPU 24 checks both the contrast value and the rate of change FS as reliability determination results, and calculates a gain correction value GV to be changed in accordance with a low-reliability one of them. After that, the camera CPU 24 advances the process to step S243.

When the camera CPU 24 ends the exposure change subroutine and returns the process to step S10, it sets the pre-release LV exposure value $EVLV_{OR}$ calculated in step S16. In the subsequent step S12, the camera CPU 24 changes the gain correction value GV of each AF area to the gain correction value GV of each AF area calculated in step S24.

Thus, the gain correction value GV is changed as appropriate during the LV display, as illustrated in FIG. 7.

Upon determining that the first release switch is depressed in step S22, the camera CPU 24 causes the image pickup device 26 to perform LV exposure by the pre-release LV exposure value $EVLV_{OR}$ and causes the AE evaluation value calculation circuit 40 and the image processing circuit 30 to load image signals of all pixels of the image pickup device 26 (step S26). In response to the image signals loaded into the image processing circuit 30, the display 36 provides LV display.

The camera CPU 24 causes the AE evaluation value calculation circuit 40 to perform photometry to calculate a post-release LV photometry result $BVAE_{1R}$ as an AE evaluation value of each area 44 (step S28). The camera CPU 24 calculates a post-release LV exposure value $EVLV_{1R}$ as the next LV exposure value based on the average value of the post-release LV photometry results $BVAE_{1R}$ of AF areas in which the camera CPU 24 has determined in step S20 that the reliability is OK and the saturation is OK, which are included in the post-release LV photometry results $BVAE_{1R}$ of the AF areas, or based on the post-release LV photometry result $BVAE_{1R}$ of an AF area in which the camera CPU 24 has determined that the reliability is the highest.

The camera CPU 24 reflects the gain correction value GV of each AF area calculated in step S24 during the image-acquisition standby mode, in AF exposure setting (step S30). In other words, the camera CPU 24 corrects the post-release LV exposure value $EVLV_{1R}$ based on the calculated the gain correction value GV and sets the corrected exposure value as an AF exposure value EVAF that is an exposure value for the AF image pickup operation. More specifically, the camera CPU 24 corrects the gain correction value GV based on the pre-release LV photometry result $BVAE_{OR}$ as a first photometric value obtained by LV photometry and the pre-release AF photometry result $BVAF_{OR}$ as a second photometric value obtained by AF photometry, and calculates the AF exposure value EVAF for the AF image pickup operation based on the corrected gain correction value $\Delta EV$. The corrected gain correction value $\Delta EV$ is given by the following equation:

$$\Delta EV = GV - (BVAE_{OR} - BVAF_{OR}).$$

The AF exposure value EVAF is given by the following equation:

$$EVAF = EVLV_{1R} + \Delta EV.$$

Based on the AF exposure value EVAF, an exposure is set.

Since the gain correction value GV calculated in step S24 is reflected in the AF exposure setting as described above, the optimum exposure value can be set during the next AF exposure after the first release switch is depressed.

Though the post-release LV exposure value $EVLV_{1R}$, which was obtained immediately after the first release switch depressing operation, is used here as a preferable LV exposure value EVLV, the foregoing pre-release LV exposure value $EVLV_{OR}$ can be used. As the pre-release LV photometry result $BVAE_{OR}$ and the pre-release AF photometry result $BVAF_{OR}$, a result calculated last during the image-acquisition standby mode before the first release switch depressing operation is used. The pre-release LV photometry result $BVAE_{OR}$ is the average value of the pre-release LV photometry results $BVAE_{OR}$ of the AF areas in which the camera CPU 24 has determined in step S20 that the reliability is OK and the saturation is OK or the pre-release LV photometry result $BVAE_{OR}$ of the AF area in which the camera CPU 24 has determined that the reliability is the highest. The same can be applied to the pre-release AF photometry result $BVAF_{OR}$. Alternatively, in most cases, the photographer holds the image pickup apparatus 10 so that a desired object can be located near the center of the image pickup area of the image pickup device 26; thus, the value of the pre-release AF photometry result $BVAF_{OR}$ of the AF area in the center of the image pickup area or the average value of the pre-release AF photometry results $BVAF_{OR}$ of the AF areas near the center of the image pickup area can be used.

The camera CPU 24 causes the image pickup device 26 to perform an AF exposure based on the AF exposure value EVAF, and causes the AF evaluation value calculation circuit 42 to load image signals of focus detection pixels, included in the image signals of the AF areas 44 of the image pickup device 26 (step S32). Then, the camera CPU 24 causes the AE evaluation value calculation circuit 40 to perform photometry to calculate a post-release AF photometry result $BVAF_{1R}$ from the image signals of the focus detection pixels as an AE evaluation value for each AF area 44 (step S34). The camera CPU 24 calculates the next AF exposure value EVAF based on the post-release AF photometry results $BVAF_{1R}$.

The camera CPU 24 causes the AF evaluation value calculation circuit 42 to perform focus detection by phase difference pixel calculation for each of the AF areas 44 and calculate reliability for each of the AF areas 44 (step S36). The process of step S34 and that of step S36 can be performed in reverse order. Alternatively, these processes can be performed in parallel and at the same time.

The camera CPU 24 determines whether there is an AF area 44 in which the reliability is OK (step S38). If the criterion of the reliability determination in step S38 is stricter than that in step S20, a reliable range-finding operation can be perform even after the first release switch is depressed. Upon determining that there is no AF area 44 in which the reliability is OK, the camera CPU 24 advances the process to step S48, which will be described later.

In contrast, upon determining that there is even one AF area 44 in which the reliability is OK, the camera CPU 24 causes the AF evaluation value calculation circuit 42 to calculate a defocus amount of the image-acquisition lens 12 from the focus detection result(s) of the AF area(s) in which the reliability is OK (step S40). The camera CPU 24 determines whether the calculated defocus amount represents a focused state or a focusable state (step S42). The defocus amount can be represented by $F\delta$, where an F-number is F and a permissible circle of confusion is $\delta$. It can be determined whether the defocus amount represents a defocused state according to whether the defocus amount falls within an allowable depth, namely, within ±1Fδ. The focusable state represents a state in which the camera is reliably focused by the next lens driving. For example, the focusable state is represented by a defocus amount out of the range of a defocus amount corresponding to the focused state and included in the range that is wider than the former range by a predetermined amount. In the focusable state, the focus lens can be focused without performing AF exposure, phase difference pixel calculation and defocus amount calculation, after lens driving.

Upon determining that the defocus amount represents a focused state or a focusable state, the camera CPU 24 drives the focus lens based on the defocus amount (step S44). More specifically, the camera CPU 24 determines a lens position where the focus lens of the image-acquiring lens 12 is focused, based on the defocus amount, and the lens frame 16 is moved via the motor drive circuit 22 and the lens motor 18. Thus, the focus lens is moved to the lens position along the optical axis direction. In the focused state, however, the lens driving amount is 0 and actually the focus lens is not driven.

The AF operation is thus ended. After that, though not shown in the figures, the camera CPU 24 performs an exposure operation in accordance with the second release depressing operation that is a release switch full-depression operation, subjects image signals from the image pickup device 26 to various types of image processing, and stores the processed images in the storing device 34.

Upon determining in step S42 that the defocus amount does not represent the focused state, the camera CPU 24 drives the focus lens based on the defocus amount (step S46). More specifically, the camera CPU 24 determines a lens position of the focus lens of the image-acquiring lens 12 based on the defocus amount and moves the lens frame 16 via the motor drive circuit 22 and the lens motor 18. Thus, the focus lens is moved to the lens position along the optical axis direction.

The camera CPU 24 sets the post-release LV exposure value $EVLV_{1R}$ calculated by the photometry process of step S28 (step S48). The camera CPU 24 causes the image pickup device 26 to perform LV exposure by the post-release LV exposure value $EVLV_{1R}$ and causes the AE evaluation value calculation circuit 40 and the image processing circuit 30 to load image signals of all pixels of the image pickup device 26 (step S50). In response to the image signals loaded into the image processing circuit 30, the display 36 provides LV display. The camera CPU 24 causes the AE evaluation value calculation circuit 40 to perform photometry to calculate a post-release LV photometry result $BVAE_{1R}$ as an AE evaluation value for each of the AF areas 44 (step S52). The camera CPU 24 calculates a post-release LV exposure value $EVLV_{1R}$ as the next LV exposure value based on the average value of the post-release LV photometry results $BVAE_{1R}$ of AF areas in which the camera CPU 24 has determined in step S38 that the reliability is OK, which are included in the post-release LV photometry results $BVAE_{1R}$ of the AF areas, or based on the post-release LV photometry result $BVAE_{1R}$ of an AF area in which the camera CPU 24 has determined that the reliability is the highest.

After that, the camera CPU 24 sets the next AF exposure value EVAF calculated by the photometry process of step S34 (step S54), and advances the process to step S32. Thus, the camera CPU 24 causes the image pickup device 26 to perform AF exposure by the AF exposure value EVAF and causes the AE evaluation value calculation circuit 42 to load image signals of focus detection pixels from the image signals of each of the AF areas of the image pickup device 26. As for the subsequent process, see the above.

As described above, the focus adjustment device according to an embodiment in the image pickup apparatus 10 performs focus adjustment in response to image signals of the image pickup device 26 including focus detection pixels. The focus adjustment device particularly includes the display 36 which provides LV display based on the image signals of the image pickup device 26, the camera CPU 24 and the AE evaluation value calculation circuit 40 serving as an exposure control section which controls the image pickup operation of the image pickup device 26 based on the LV exposure value EVLV for the LV display to acquire the image signals, the camera CPU 24 and the AF evaluation value calculation circuit 42 serving as a focus detection section which performs focus detection based on image signals of the focus detection pixels, included in the image signals of the image pickup device 26, calculates a gain correction value GV to correct the image signals of the focus detection pixels based on a result of the focus detection, and corrects image signals of focus detection pixels to be acquired by the next image pickup operation with the gain correction value GV to perform the focus detection, the operation section 38 serving as an instruction section which provides instruction to start focus adjustment, and the camera CPU 24 serving as a control section which performs focus adjustment based on the image signals of the focus detection pixels in accordance with the first release switch depressing operation as the instruction of the instruction section. The camera CPU 24 corrects the LV exposure value EVLV based on the gain correction value GV by the exposure control section in accordance with the first release switch depressing operation and causes the image pickup device 26 to perform an AF image pickup operation using the corrected exposure value as an AF exposure value EVAF for the AF image pickup operation. The focus detection section performs focus detection based on the image signals of the focus detection pixels in accordance with the AF image pickup operation. In other words, in the focus adjustment device, the LV exposure value EVLV for LV display corrected based on the gain correction value GV, which is calculated before the first release switch depressing operation, in accordance with the first release switch depressing operation, is used as an AF exposure value EVAF for the AF image pickup operation. Thus, the AF after the first release switch depressing operation can be performed at high speed by the optimum AF exposure.

The camera CPU 24 also functions as a determination section which determines whether the image signals of the focus detection pixels are saturated or not. The focus detection section calculates the gain correction value GV when the determination section determines that the image signals of the focus detection pixels are saturated before the first release switch depressing operation. In the focus adjustment device, therefore, when the image signals of the focus detection pixels are saturated, a gain correction value GV to cancel the saturation can be calculated, and an appropriate AF exposure value EVAF can be set in accordance with the first release switch depressing operation.

The camera CPU 24 also functions as a calculation section which makes a focus detection calculation based on the image signals of the focus detection pixels to calculate reliability. When the reliability calculated by the calculation section is low before the first release switch depressing operation, the focus detection section calculates the gain correction value GV. In the focus adjustment device, therefore, when the reliability is low as a result of the focus detection calculation, a gain correction value GV to obtain a high-reliability result of the focus detection calculation can be calculated, and an appropriate AF exposure value EVAF can be set in accordance with the first release switch depressing operation.

The camera CPU 24 also functions as a setting section which sets the AF areas 44 in the image pickup area 26A of the image pickup device 26, a determination section which determines whether the image signals of the focus detection pixels are saturated for each of the AF areas 44, a calculation section which makes a focus detection calculation based on the image signals of the focus detection pixels for each of the AF areas to calculate reliability. The focus detection section calculates the gain correction value GV when there is no AF area 44 in which the determination section determine that the image signals of the focus detection pixels are not saturated before the first release switch depressing operation, and that the reliability exceeds a predetermined threshold value. In the focus adjustment device, therefore, when a high-reliability result of the focus detection calculation is not obtained though the image signals of the focus detection pixels are not saturated, a gain correction value GV to obtain a high-reliability result of the focus detection calculation can be calculated, and an appropriate AF exposure value EVAF can be set in accordance with the first release switch depressing operation.

In the above case, when the camera CPU 24 determines that a plurality of reliabilities acquired for the same AF area 44 at different times fall within a predetermined permissible range before the first release switch depressing operation, the focus detection section corrects the gain correction value GV using the latest gain correction value calculated for the AF area 44 as a basis. In the focus adjustment device, therefore, a more appropriate AF exposure value EVAF can be set using a high-stability gain correction value as a basis.

The focus detection section corrects the gain correction value GV such that the image signals of the focus detection pixels become smaller for the AF area 44 in which the camera CPU 24 determines that the image signals are saturated, before the first release switch depressing operation. In other words, the focus detection section corrects the gain correction value GV such that the image signals of the focus detection pixels become smaller for the AF area 44 in which the image signals of the focus detection pixels are saturated. Thus, the saturation can be canceled.

Alternatively, the focus detection section corrects the gain correction value GV such that the image signals of the focus detection pixels become larger for the AF area 44 in which the camera CPU 24 determines that the image signals are not saturated, before the first release switch depressing operation. In other words, the focus detection section corrects the gain correction value GV such that the image signals of the focus detection pixels become larger for the AF area 44 in which the image signals of the focus detection pixels are not saturated. Thus, a high-reliability focus detection calculation result can be obtained.

In the above case, the focus detection section determines a correction amount of the gain correction value GV based on the ratio of the reliability to the threshold value. In the focus adjustment device, therefore, a correction amount corresponding to a plurality of exposure steps can be set based on the ratio of the reliability to the threshold value.

Furthermore, the AE evaluation value calculation circuit 40 functions as a photometry section which generates a pre-release LV photometry result $BVAE_{OR}$ as a first photometric value by the photometry for LV display and generates a pre-release AF photometry result $BVAF_{OR}$ as a second photometric value by the photometry for focus adjustment, based on the image signals of the image pickup device 26. The focus detection section corrects the gain correction value GV based on the pre-release LV photometry result $BVAE_{OR}$ and the pre-release AF photometry result $BVAF_{OR}$ and calculates the AF exposure value EVAF for the AF image pickup operation based on the corrected gain correction value ΔEV. In the focus adjustment device, therefore, an exposure value for the AF image pickup operation can be calculated based on a more accurate gain correction value ΔEV.

The focus adjustment method according to an embodiment is a method for performing focus adjustment by image signals of the image pickup device 26 including focus detection pixels. The focus adjustment method particularly includes controlling the image pickup operation of the image pickup device 26 based on the LV exposure value EVLV for providing LV display to the display 36 based on the image signals of the image pickup device 26 to acquire the image signals (step S14), performing focus detection based on image signals of the focus detection pixels, included in the image signals of the image pickup device 26 (step S18), calculating the gain correction value GV to correct the image signals of the focus detection pixels based on a result of the focus detection (step S24), performing focus detection by correcting the image signals of the focus detection pixels acquired in the subsequent image pickup operation, with the gain correction value GV (steps S12 and S18), providing instruction to start the focus adjustment by depressing the first release switch (step S22), correcting the LV exposure value EVLV based on the gain correction value GV when the focus adjustment is performed based on the image signals of the focus detection pixels in accordance with the depression of the first release switch and using the corrected exposure value as an AF exposure value EVAF for the AF image pickup operation (step S30), causing the image pickup device 26 to perform the AF image pickup operation (step S32), and performing focus detection based on the image signals of the focus detection pixels by the AF image pickup operation (step S36). Since the LV exposure value EVLV for LV display, which is corrected based on the gain correction value GV calculated before the depression of the first release switch in accordance with the depression of the first release switch, is used as an AF exposure value EVAF for the AF image pickup operation, the AF after the depression of the first release switch can be performed at high speed by the optimum AF exposure.

A non-transitory storage medium according to an embodiment stores computer-readable focus adjustment programs which are executed by the camera CPU 24 that is a computer to perform focus adjustment by the image signals of the image pickup device 26 including focus detection pixels. The focus adjustment programs cause the camera CPU 24 to control the image pickup operation of the image pickup device 26 based on the LV exposure value EVLV for providing LV display to the display 36 based on the image signals of the image pickup device 26 to acquire the image signals (step S14), perform focus detection based on image signals of the focus detection pixels, included in the image signals of the image pickup device 26 (step S18), calculate the gain correction value GV to correct the image signals of the focus detection pixels based on a result of the focus detection (step S24), perform focus detection by correcting the image signals of the focus detection pixels acquired in the subsequent image pickup operation, with the gain correction value GV (steps S12 and S18), provide instruction to start the focus adjustment by depressing the first release switch (step S22), correct the LV exposure value EVLV based on the gain correction value GV when the focus adjustment is performed based on the image signals of the focus detection pixels in accordance with the depression of the first release switch and use the corrected exposure value as an AF exposure value EVAF for the AF image pickup operation (step S30), cause the image pickup device 26 to perform the AF image pickup operation (step S32), and perform focus detection based on the image signals of the focus detection pixels by the AF image pickup operation (step S36). Since the LV exposure value EVLV for LV display, which is corrected based on the gain correction value GV calculated before the depression of the first release switch in accordance with the depression of the first release switch, is used as an AF exposure value EVAF for the AF image pickup operation, the AF after the depression of the first release switch can be performed at high speed by the optimum AF exposure.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A focus adjustment device which performs focus adjustment in response to image signals of an image pickup device including focus detection pixels, the device comprising:
    a display configured to provide live view display based on the image signals of the image pickup device;
    a switch configured to provide instruction to start focus adjustment; and
    a processor configured to:
        control an image pickup operation of the image pickup device based on an exposure value for the live view display to the display based on the image signals of the image pickup device to acquire the image signals;
        perform focus detection based on image signals of the focus detection pixels, included in the image signals of the image pickup device;
        calculate a gain correction value to correct the image signals of the focus detection pixels based on a result of the focus detection;
        correct image signals of focus detection pixels to be acquired by a next image pickup operation with the gain correction value to perform the focus detection;
        perform focus adjustment based on the image signals of the focus detection pixels in accordance with the instruction of the switch;
        correct the exposure value based on the gain correction value when the focus adjustment is performed based on the image signals of the focus detection pixels in accordance with the instruction to start the focus adjustment;
        cause the image pickup device to perform an AF image pickup operation using the corrected exposure value as an exposure value for the AF image pickup operation; and
        perform focus detection based on the image signals of the focus detection pixels in accordance with the AF image pickup operation.

2. The device according to claim 1, wherein the processor is further configured to:
    determine whether the image signals of the focus detection pixels are saturated or not; and
    calculate the gain correction value when the processor determines that the image signals of the focus detection pixels are saturated before the instruction.

3. The device according to claim 1, wherein the processor is further configured to:
    make a focus detection calculation based on the image signals of the focus detection pixels to calculate reliability; and
    calculate the gain correction value when the reliability calculated by the processor is low before the instruction section provides the instruction.

4. The device according to claim 1, wherein the processor is further configured to:
    set a plurality of focus detection areas in an image pickup area of the image pickup device;
    determine whether the image signals of the focus detection pixels are saturated for each of the focus detection areas;
    make a focus detection calculation based on the image signals of the focus detection pixels for each of the focus detection areas to calculate reliability; and
    calculate the gain correction value when there is no focus detection area in which the processor determines that the image signals of the focus detection pixels are not saturated before the instruction, and that the reliability exceeds a predetermined threshold value.

5. The device according to claim 4, wherein
    when the processor determines that a plurality of reliabilities acquired for a same focus detection area at different times fall within a predetermined permissible range before the instruction section provides the instruction, and corrects the gain correction value using a latest gain correction value calculated for the focus detection area as a basis.

6. The device according to claim 5, wherein
    the processor corrects the gain correction value such that the image signals of the focus detection pixels become smaller for the focus detection area in which the processor determines that the image signals are saturated, before the instruction.

7. The device according to claim 5, wherein
    the processor corrects the gain correction value such that the image signals of the focus detection pixels become larger for the focus detection area in which the processor determines that the image signals are not saturated, before the instruction.

8. The device according to claim 7, wherein
    the processor determines a correction amount of the gain correction value based on a ratio of the reliability to the threshold value.

9. The device according to claim 1, wherein the processor is further configured to:
    generate a first photometric value by photometry for the live view display and generates a second photometric value by photometry for focus adjustment, based on the image signals of the image pickup device; and
    correct the gain correction value based on the first photometric value and the second photometric value and calculates the exposure value for the AF image pickup operation based on the corrected gain correction value.

10. A focus adjustment method for performing focus adjustment by image signals of an image pickup device including focus detection pixels, the method comprising:

controlling an image pickup operation of the image pickup device based on an exposure value for providing live view display to a display section based on the image signals of the image pickup device to acquire the image signals;

performing focus detection based on image signals of the focus detection pixels, included in the image signals of the image pickup device, calculating a gain correction value to correct the image signals of the focus detection pixels based on a result of the focus detection, and performing focus detection by correcting image signals of focus detection pixels acquired in a next image pickup operation, with the gain correction value;

providing instruction to start the focus adjustment;

correcting the exposure value based on the gain correction value when the focus adjustment is performed based on the image signals of the focus detection pixels in accordance with the instruction to start the focus adjustment, and causing the image pickup device to perform an AF image pickup operation using the corrected exposure value as an exposure value for the AF image pickup operation; and performing focus detection based on the image signals of the focus detection pixels by the AF image pickup operation.

11. The method according to claim 10, further comprising:

determining whether the image signals of the focus detection pixels are saturated or not, wherein the calculating the gain correction value includes calculating the gain correction value in case of determining that the image signals of the focus detection pixels are saturated before the instruction.

12. The method according to claim 10, further comprising:

making a focus detection calculation based on the image signals of the focus detection pixels to calculate reliability, wherein the calculating the gain correction value includes calculating the gain correction value when calculated reliability is low before the instruction.

13. The method according to claim 10, further comprising:

setting a plurality of focus detection areas in an image pickup area of the image pickup device;

determining whether the image signals of the focus detection pixels are saturated for each of the focus detection areas; and making a focus detection calculation based on the image signals of the focus detection pixels for each of the focus detection areas to calculate reliability, wherein the calculating the gain correction value includes calculating the gain correction value when there is no focus detection area in which is determined that the image signals of the focus detection pixels are not saturated before the instruction, and that the reliability exceeds a predetermined threshold value.

14. The method according to claim 13, wherein in case of determining that a plurality of reliabilities acquired for a same focus detection area at different times fall within a predetermined permissible range before the instruction, the calculating the gain correction value includes correcting the gain correction value using a latest gain correction value calculated for the focus detection area as a basis.

15. The method according to claim 14, wherein the calculating the gain correction value includes correcting the gain correction value such that the image signals of the focus detection pixels become smaller for the focus detection area in which is determined that the image signals are saturated, before the instruction.

16. The method according to claim 14, wherein the calculating the gain correction value includes correcting the gain correction value such that the image signals of the focus detection pixels become larger for the focus detection area in which is determined that the image signals are not saturated, before the instruction.

17. The method according to claim 16, wherein the calculating the gain correction value includes determining a correction amount of the gain correction value based on a ratio of the reliability to the threshold value.

18. The method according to claim 10, further comprising:

generating a first photometric value by photometry for the live view display and generating a second photometric value by photometry for focus adjustment, based on the image signals of the image pickup device; and correcting the gain correction value based on the first photometric value and the second photometric value and calculating the exposure value for the AF image pickup operation based on the corrected gain correction value.

19. A non-transitory storage medium for storing computer-readable focus adjustment programs which are executed by a computer which performs focus adjustment by image signals of an image pickup device including focus detection pixels, when the focus adjust programs are executed by the computer, the focus adjust programs causing the computer to:

control an image pickup operation of the image pickup device based on an exposure value for providing live view display to a display section based on the image signals of the image pickup device to acquire the image signals;

perform focus detection based on image signals of the focus detection pixels, included in the image signals of the image pickup device, calculate a gain correction value to correct the image signals of the focus detection pixels based on a result of the focus detection, and perform focus detection by correcting image signals of focus detection pixels acquired in a next image pickup operation, with the gain correction value;

provide instruction to start the focus adjustment;

correct the exposure value based on the gain correction value when the focus adjustment is performed based on the image signals of the focus detection pixels in accordance with the instruction to start the focus adjustment, and cause the image pickup device to perform an AF image pickup operation using the corrected exposure value as an exposure value for the AF image pickup operation; and perform focus detection based on the image signals of the focus detection pixels by the AF image pickup operation.

20. The medium according to claim 19, wherein when the focus adjust programs are executed by the computer, the focus adjust programs further causes the computer to determine whether the image signals of the focus detection pixels are saturated or not, and the causing the computer to calculate the gain correction value includes causing the computer to calculate the gain correction value when the computer determines that the image signals of the focus detection pixels are saturated before the instruction.

21. The medium according to claim 19, wherein
when the focus adjust programs are executed by the computer, the focus adjust programs further causes the computer to make a focus detection calculation based on the image signals of the focus detection pixels to calculate reliability, and
the causing the computer to calculate the gain correction value includes causing the computer to calculate the gain correction value when the reliability calculated by the computer is low before the instruction.

22. The medium according to claim 19, wherein
when the focus adjust programs are executed by the computer, the focus adjust programs further causes the computer to
set a plurality of focus detection areas in an image pickup area of the image pickup device;
determine whether the image signals of the focus detection pixels are saturated for each of the focus detection areas; and
make a focus detection calculation based on the image signals of the focus detection pixels for each of the focus detection areas to calculate reliability, and
the causing the computer to calculate the gain correction value includes causing the computer to calculate the gain correction value when there is no focus detection area in which the computer determine that the image signals of the focus detection pixels are not saturated before the instruction, and that the reliability exceeds a predetermined threshold value.

\* \* \* \* \*